Oct. 9, 1951  S. F. MOTT  2,570,472

MANURE SPREADING MACHINE

Filed Sept. 8, 1949

Inventor
Stanley Fielder Mott
By
Munn, Liddy & Glaccum
Attorneys

Patented Oct. 9, 1951

2,570,472

UNITED STATES PATENT OFFICE 2,570,472

MANURE SPREADING MACHINE

Stanley F. Mott, Leamington Hastings, near Rugby, England

Application September 8, 1949, Serial No. 114,475
In Great Britain September 8, 1948

5 Claims. (Cl. 275—8)

This invention is concerned with reducing the manual labour involved in the spreading of manure. Such work is very laborious and slow and is therefore also very expansive.

According to the present invention manure is delivered in two rows on to a field by a manure spreading machine trailing behind a vehicle loaded with manure and is distributed outwardly by rotating blades.

The manure spreading machine may be attached to the vehicle by hinge pins on each side and may have a castor wheel supporting the rear end of the frame of the machine. It can be left in the field which is to be spread with manure and is adapted to be quickly hitched on as successive loads are brought in for spreading.

A gap is provided between the manure spreading machine and the rear end of the vehicle floor so that manure raked off the vehicle falls through this gap and is then distributed outwardly by rotating blades driven either from engine power carried on the machine or from the tractor drawing the load. The vehicle carrying the manure has a floor which is inclined downwardly and rearwardly or which may be so inclined so as to facilitate the raking down of the manure.

Other parts of the invention are embodied in the preferred form which will now be described in some detail by way of example with reference to the accompanying drawings in which.

Figure 1:
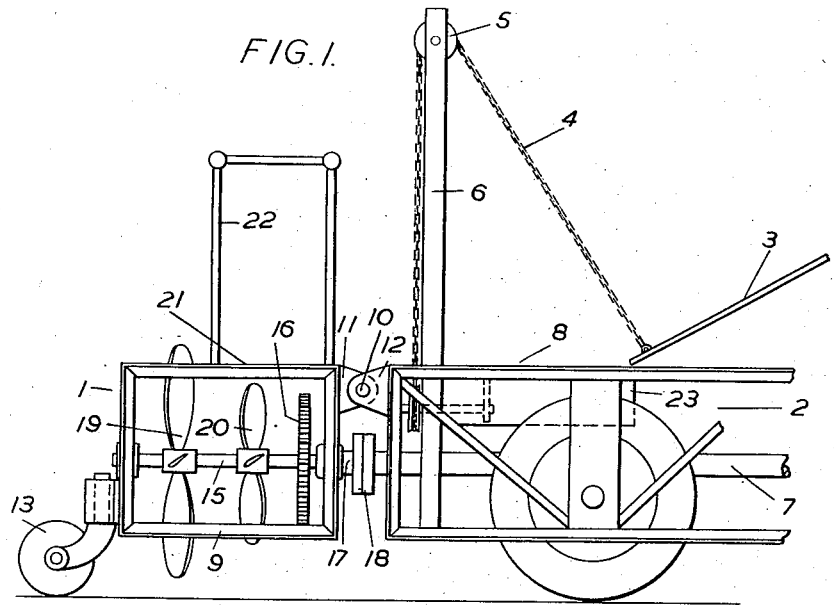
Fig. 1 is a side view of the manure spreader hitched to a trailer of which only those parts are shown which are necessary to an understanding of the invention.
Figure 2:
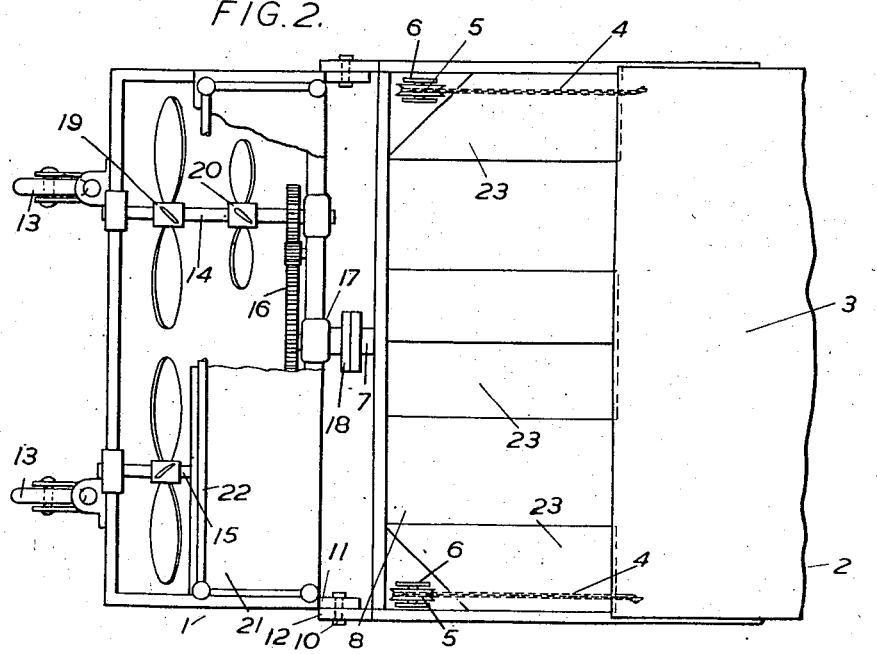
Fig. 2 is a plan view with parts cut away.

In this form, the manure spreader 1 is adapted to be hitched behind a vehicle 2 of known construction comprising a wheeled trailer with a chassis having a platform 3 which can be raised or lowered by chains 4 passing over pulleys 5 on upright posts 6 on the chassis. The platform 3 is raised or lowered by power from a shaft 7 and by raising one end (not shown) the platform can be inclined downwardly towards the rear, moving forward relatively to the chassis 2 and leaving a gap 8 at the rear end.

The spreader 1 comprises a chassis 9 which is adapted to be hinged to the trailer by means of hinge pins 10 passing through lugs 11, 12 on the chassis 9 and the chassis 2 of the vehicle. It is supported at its rear end by castor wheels 13.

Mounted in the chassis are two propeller shafts 14, 15 connected by suitable gearing shown conventionally at 16 to a central shaft 17. The shaft 17 is driven either by a separate power source mounted on the chassis 2 or as shown from the shaft 7 of the trailer to which it may be connected by any suitable type of clutch indicated at 18. The shafts 14, 15 are rotated from shaft 17 in directions opposite to each other.

On each shaft 14, 15 are mounted successive propellers 19, 20 of increasing length of blade, the propellers 20 nearest the front of the chassis 9 being smallest.

A platform 21 is mounted on the chassis at the front end thereof on which two men can stand and this platform is railed off by a railing 22 for the protection of the men.

The operation of the spreader is as follows. Manure is loaded on to the platform 3 by any convenient means and brought to the field which is to be spread with manure. The manure spreader is then hitched to the trailer and connection made by the clutch 18 between the power shaft 7 and the driving shaft 17. The platform 3 is inclined by raising the front end.

As the spreader is drawn across the field the manure is raked by men standing on the platform 21 so as to fall through the space 8 into two rows vertically below the two propeller shafts. To facilitate this, the space is divided up by sloping guides 23, which direct the manure as required.

As the spreader passes along these rows, the blades on the propellers scatter the manure outwardly, the smallest propellers scattering the top first and the larger ones then scattering the bottom portion.

It will be seen that only light manual labour is involved. The men have only to fork the manure into a low hopper and to scrape the tipped loads into an aperture with a manure drag.

It will be understood that the invention is not restricted to the details of the preferred form described which may be modified without departing from the broad ideas underlying them. For example, the manure spreading machine may be used with any suitable vehicle carrying the manure.

I claim:

1. A manure spreading machine comprising a wheeled chassis, means for connecting the chassis with a vehicle, spaced shafts mounted parallel to the longitudinal axis of the chassis, means for rotating the shafts in opposite directions and a series of propellers of increasing blade size mounted on each of the shafts, the blades of the foremost propellers being the smallest and the blades of the rearmost propellers being the largest.

2. A manure spreading machine comprising a wheeled chassis, means for towing the chassis behind a vehicle having a power driven shaft, two spaced shafts mounted parallel to the longitudinal axis of the chassis, a central shaft on the chassis, gear connections between the central shaft and each of the parallel shafts to rotate the parallel shafts in opposite directions, means for connecting the central shaft in driven relationship with the vehicle power shaft and a series of propellers on each parallel shaft, the blades of the propellers increasing in length, the blades of the foremost propellers being the shortest and the blades of the rearmost propellers being the longest.

3. A manure spreading machine according to claim 1 having a platform mounted on said chassis on which operators can stand.

4. A manure spreading machine according to claim 1 in which the chassis has a caster wheel at the rear end.

5. A manure spreading machine according to claim 1 in combination with sloping guides to direct manure delivered from the vehicle into rows below the propellers.

STANLEY F. MOTT.

REFERENCES CITED

The following references are of record in the file of this patent:

UNITED STATES PATENTS

| Number | Name | Date |
| --- | --- | --- |
| Re. 12,997 | Waddell | July 27, 1909 |
| 92,122 | Stoddard | June 29, 1869 |
| 571,896 | Clover | Nov. 24, 1896 |
| 1,616,303 | Campbell | Feb. 1, 1927 |
| 1,932,928 | Frisch | Oct. 31, 1933 |
| 2,059,607 | Pullar et al. | Nov. 3, 1936 |
| 2,281,212 | Stoltzfus | Apr. 28, 1942 |
| 2,290,126 | Flink | July 14, 1942 |